United States Patent
Onufer

[15] 3,693,685
[45] Sept. 26, 1972

[54] FASTENER
[72] Inventor: George R. Onufer, Tulsa, Okla.
[73] Assignee: Russell, Burdsall & Ward Bolt and Nut Co., Port Chester, N.Y.
[22] Filed: May 14, 1971
[21] Appl. No.: 143,354

Related U.S. Application Data

[63] Continuation-in-part of Ser. No. 806,119, March 11, 1969, Pat. No. 3,638,700.

[52] U.S. Cl. .................... 151/21 C, 10/86 A, 151/37
[51] Int. Cl. ...................... F16b 39/282, F16b 39/30
[58] Field of Search .......... 151/37, 35, 19 A, 7, 21 C, 151/21 A, 14 R; 85/32 R, 32 V, 35, 34; 10/86 R, 86 A, 86 F

[56] References Cited

UNITED STATES PATENTS

| | | | |
|---|---|---|---|
| 1,209,302 | 12/1916 | Zottel | 151/21 C |
| 2,112,494 | 3/1938 | Olson | 151/37 |
| 2,147,209 | 2/1939 | Olson | 151/37 |
| 2,299,209 | 10/1942 | Brackett | 85/32 R |
| 2,931,411 | 4/1960 | Keehan | 151/37 |
| 3,030,997 | 4/1962 | Collins | 151/7 |
| 3,357,293 | 12/1967 | Holton | 85/35 |
| 3,431,546 | 3/1969 | Averill | 151/37 X |
| 3,438,416 | 4/1969 | Thurston | 151/37 |
| 3,468,212 | 9/1969 | Tinnerman | 85/32 R |

FOREIGN PATENTS OR APPLICATIONS

| | | | |
|---|---|---|---|
| 178,073 | 7/1917 | Canada | 151/21 C |
| 2,620 | 12/1887 | Great Britain | 151/21 C |

*Primary Examiner*—Ramon S. Britts
*Attorney*—Burton and Parker

[57] ABSTRACT

A nut, for mounting on a screw extending through a member against which the nut is to be tightened, has a plurality of spiral ramps on the face adapted to abut the member during nut tightening, with the ramps arranged adjacent the nut bore and having the high ends which first engage the member being disposed radially closer to the bore axis than the lower opposite ends with the slope of the ramp between such ends being opposite to the helix slope of the thread of the screw whereby the member is ironed radially inwardly by the ramps during nut tightening to force portions of the member into the threads of the screw increasing the locking action between the screw, the nut and such member. In a modification of the nut the ramps may be either concentric or spiral, but have end faces opposing unthreading of the nut. The ramps may have a screw thread form on their radially inwardly facing edges to provide a lead screw action in starting a screw member through an unthreaded bore of the nut. Also disclosed is an application of the ramp concept to a bolt head and to a lock washer. Methods of making the nut are also shown.

3 Claims, 26 Drawing Figures

INVENTOR
GEORGE R. ONUFER
BY
Burton & Parker
ATTORNEYS

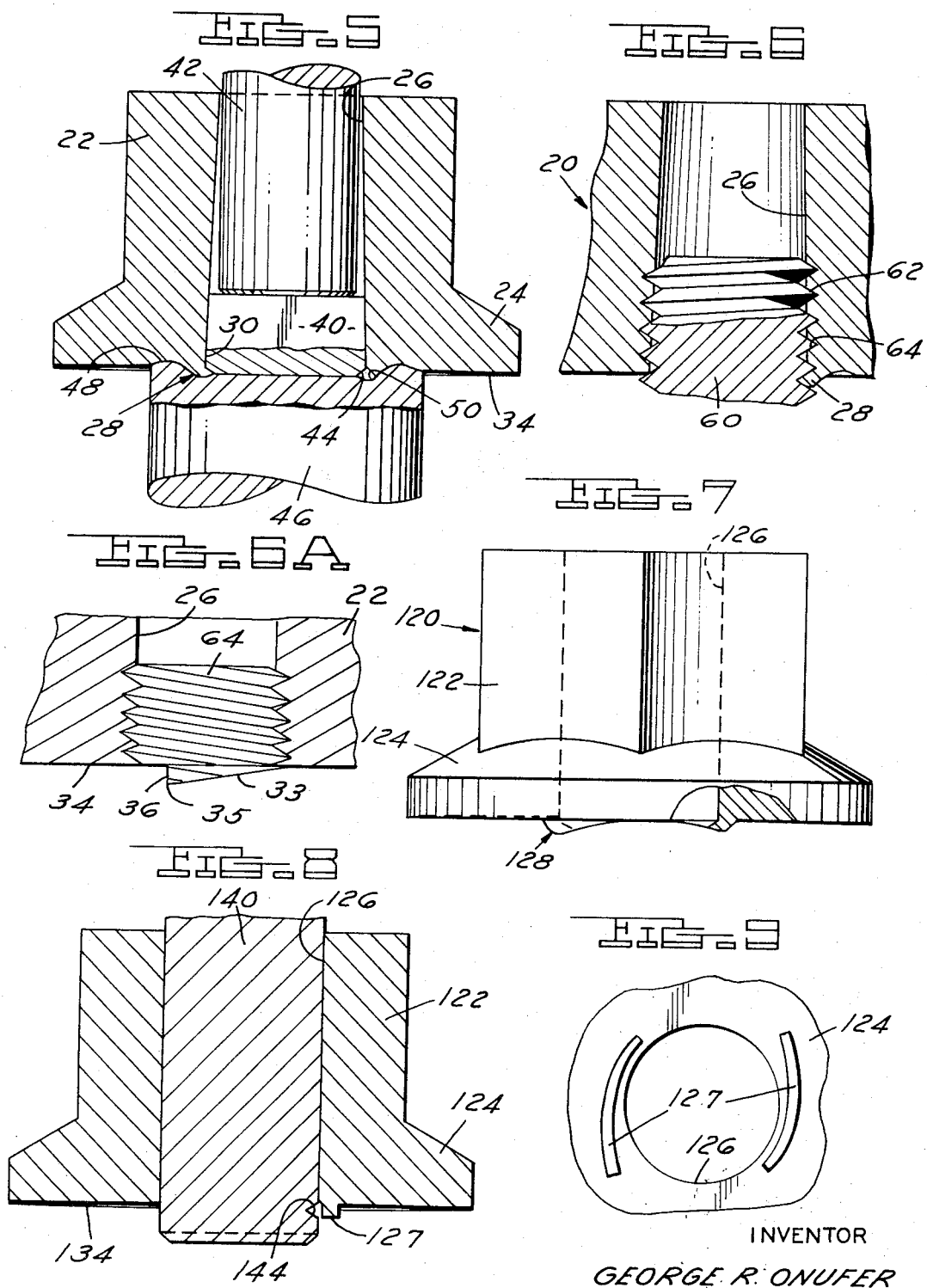

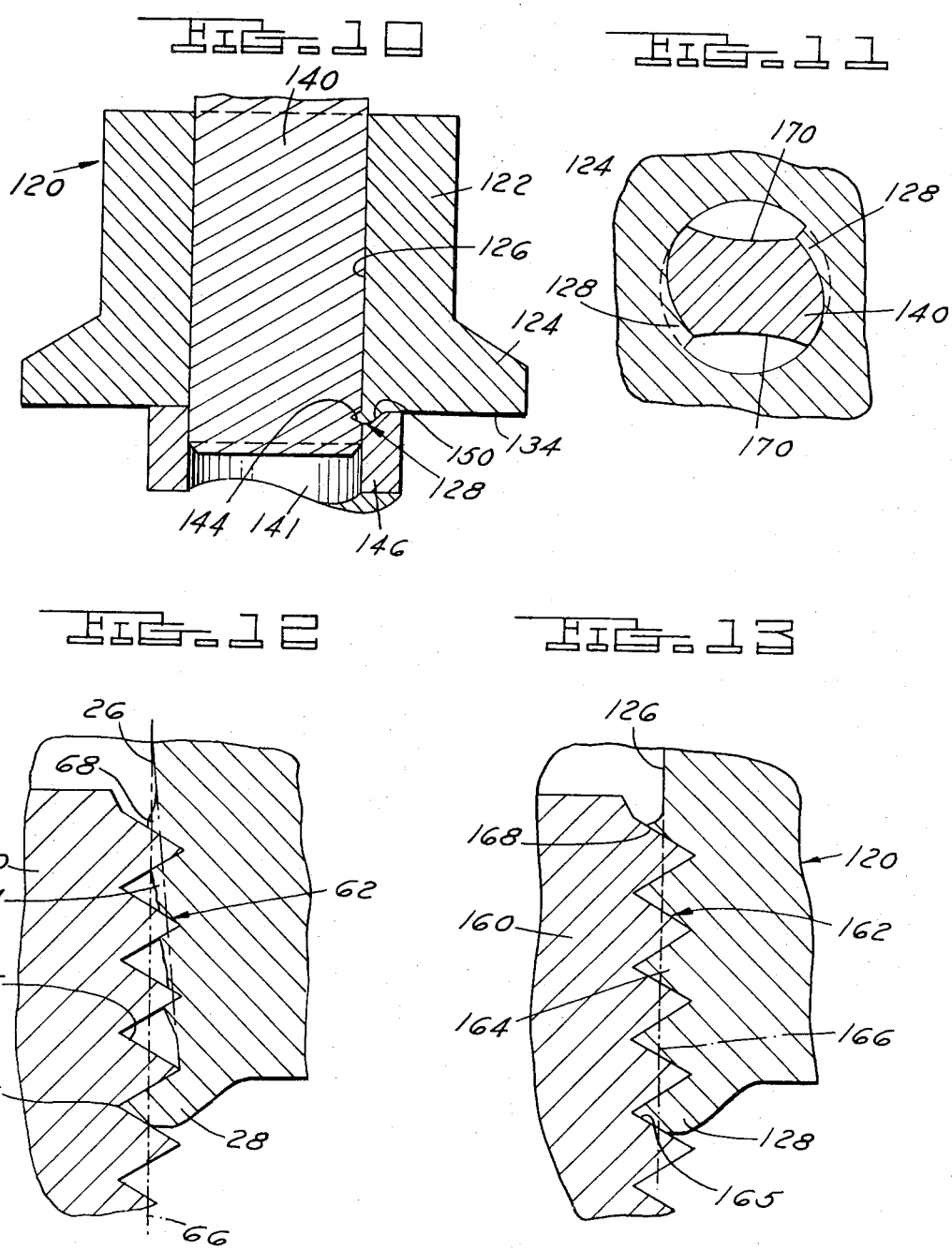

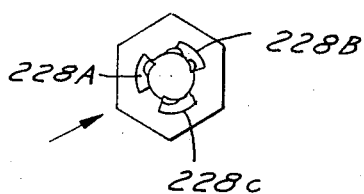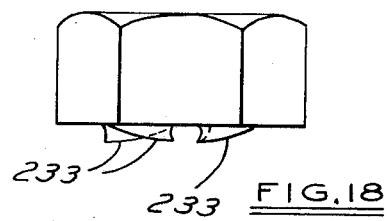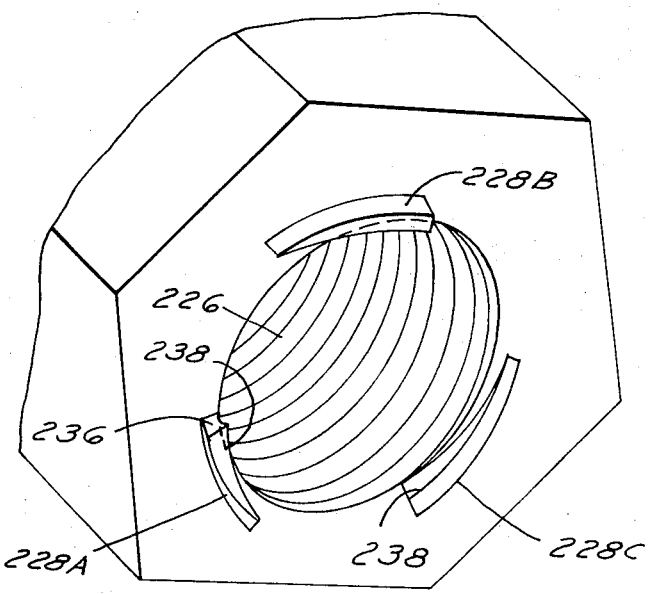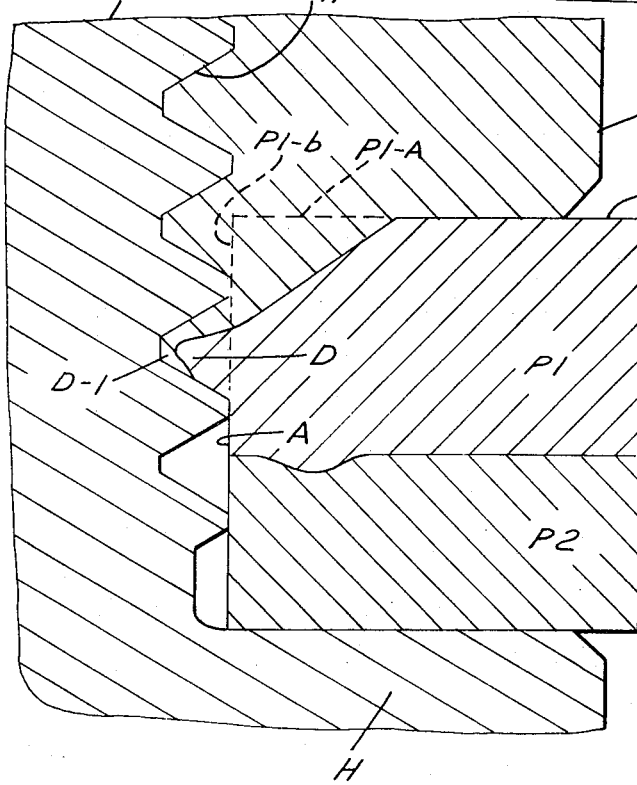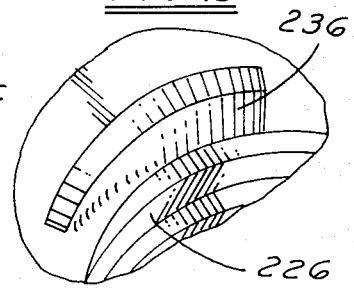

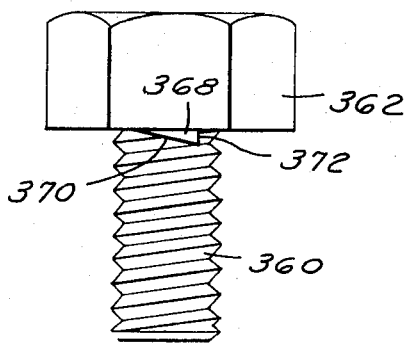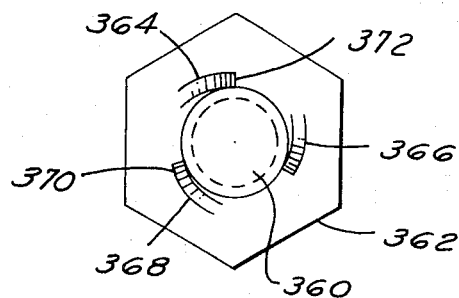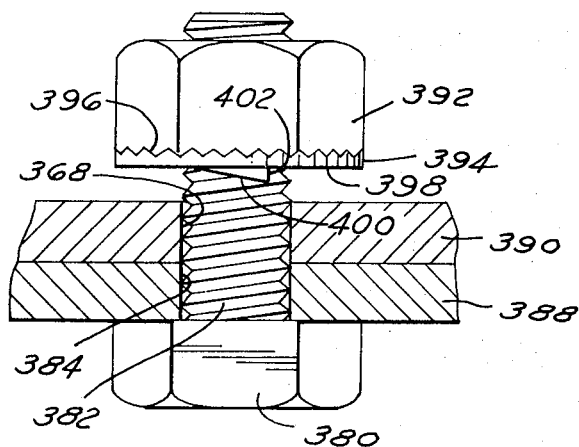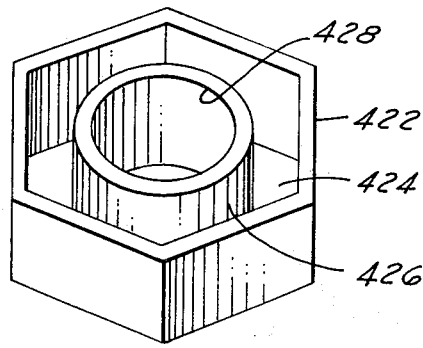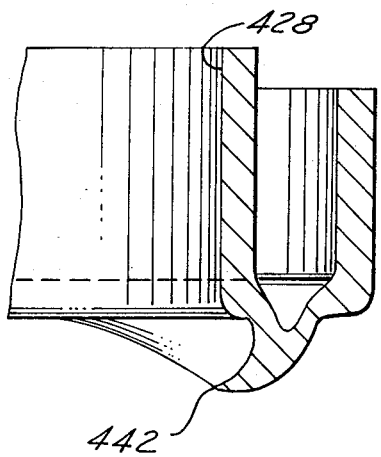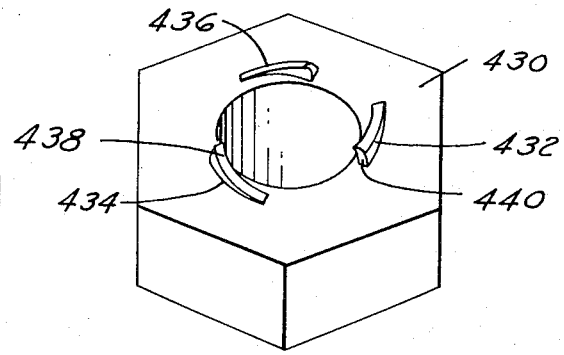

FASTENER

This application is a continuation-in-part of U.S. Pat. Application Ser. No. 806,119 filed March 11, 1969, now U.S. Pat. No. 3,638,700, and further amplifies and modifies the disclosure thereof.

BACKGROUND OF THE INVENTION

In general the purpose of this invention is to provide an inexpensive fastener element such as a nut which serves to force or iron the material of the part, against which the nut is tightened, radially into the threads of the screw member upon which the nut is mounted thereby effectively increasing the locking and holding action of the screw member with such part and with the nut.

It is conventional practice in securing two parts together, such as a pair of panels, to provide aligned holes in the parts through which a screw or bolt is extended with the bolt head overlying the outside surface of one part and a nut mounted on the bolt overlying the outside of the other part with the nut being tightened on the bolt to draw the two parts tightly together. (Unless otherwise mentioned, the terms "bolt" and "screw" as used herein means simply a screw threaded male element.) Among other things the strength of such a connection depends upon the shear resistance of the threaded engagement between the nut and bolt. An object of my invention is to increase the strength and locking action of such a connection by providing a relatively inexpensive nut which as it is tightened against the outside surface of the abutting part will iron radially inwardly the marginal edge of the hole in the part through which the bolt extends causing the same to be embedded in the threads of the bolt whereby such part is itself directly locked on the bolt. With the part directly locked on the bolt the overall strength of the connection is increased as the shear strength of the threaded connection between the bolt and nut is now supplemented by the shear strength of the embedded margin of the bolt hole in the bolt threads. Additionally the bolt and the part embedded in it are locked against relative rotation thereby increasing the resistance to undesired loosening of the connection by vibration and the like, and as shown herein an increased locking action of the nut may also occur.

As thus described the invention has particular, though not exclusive utility, for use with unthreaded nuts which are mounted on threaded bolts by the bolt forming a thread in the nut as the bolt is screwed through the nut.

In carrying out the invention I provide a plurality of ramps on the face of the nut which is to engage the underlying surface of the part against which the nut will be tightened. These ramps, in a preferred form of the invention, are arranged spirally with respect to and are closely adjacent the nut bore. The spiral geometry is such that the high point of each ramp, i.e., the point of the ramp that first engages the surface of the part, is disposed radially closer to the axis of the nut bore than the other end of the ramp, and the direction of ramp slope from such high point to its other end is the same as the direction for tightening the nut, or in other words, the slope of the ramp between its high and low points is opposite the slope of the thread helix of the bolt. As a consequence, when the nut is rotated with the ramp engaging the margin of the part surrounding the bolt hole, the marginal edge of the hole is wiped, or ironed radially inwardly into the threads of the bolt to secure such part directly to the bolt threads.

The ramps may be provided with threads on their inner edges to act as a lead screw in guiding a bolt into the unthreaded bore of the nut and assist in urging the bolt and nut together as the bolt forms threads in the nut.

In the form of the ramps shown herein, each ramp terminates at its high point at a face which extends from such high point substantially perpendicularly down to the end face of the nut and which face looks in the unthreading direction of nut rotation so that unthreading is resisted by such face. This feature may be utilized in a ramp which is either spirally or concentrically arranged around the nut bore.

The ramps may also be formed as somewhat radially inwardly curled lips which are deformed radially inwardly to grip the threads of the bolt as the nut is tightened and thereby lock the nut on the bolt to prevent loosening under vibration or the like.

In one embodiment of nut disclosed herein, the nut bore may be a smooth conical wall into the larger end of which the bolt is introduced for rotation and thread forming of the wall. In another embodiment the nut bore is a smooth cylindrical wall equal substantially to the pitch diameter of the bolt.

The method of forming a nut of this invention includes forming a nut body, including the aperture or bore as defined hereinabove. The end of the body adjacent the aperture opening is then deformed to provide a plurality of spiral ramps as defined hereinabove. The spiral ramps may be formed by impacting the end of the body with a die member having a plurality of spiral concave edges which deform the end of the body inwardly, causing the ramps to be deformed axially outwardly.

In another embodiment of the method of this invention, a plurality of axially extending ramps are formed on the nut during the formation of the nut body. The ramps are located adjacent the aperture opening but are spaced therefrom. The ramps are then deformed radially inwardly to provide radially inwardly curled lips as mentioned hereinabove. A mandrel may be used to form the spiral lip portions. The mandrel is received within the aperture in the nut body. The mandrel includes a plurality of peripheral grooves configured to form the spiral lips. When the ramps are impacted or otherwise deformed into the peripheral grooves in the mandrel the lips are thereby formed. The mandrel is provided with slots extending through the end of the mandrel, permitting rotation of the mandrel to receive the formed lips in the slots, and removal of the mandrel from the nut body.

The following patents show the state of the art. None of them however, teach the concepts above outlined and hereinafter more completely described:

| U.S. | 1,337,424 | 3,030,997 |
|------|-----------|-----------|
|      | 2,299,209 | 3,357,293 |
|      |           | 3,468,212 |

BRIEF DESCRIPTION OF THE DRAWINGS

FIG. 5 is a side cross-sectional view of the nut shown in FIG. 2, showing the method of forming the nut;

FIG. 6 is a partial cross-sectional view of the embodiment of the nut shown in FIG. 2, receiving a male threaded member;

FIG. 6A is a fragmentary cross-sectional view taken along the line 6A—6A of FIG. 4, showing the nut after the bolt of FIG. 6 has been backed out and showing in elevation one of the ramps 28;

FIG. 7 is a side, partially cross-sectioned view of another embodiment of the nut of this invention;

FIG. 8 is a side cross-sectional view of the nut shown in FIG. 7 but during formation, with the mandrel therein;

FIG. 9 is an end view of the partially formed nut shown in FIG. 8;

FIG. 10 is another step in the formation of the nut shown in FIG. 7;

FIG. 11 is a cross-sectional end view of the embodiment shown in FIG. 10;

FIG. 12 is a partial, cross-sectional view of the embodiment of the nut shown in FIG. 2, receiving a male threaded member;

FIG. 13 is a partial, cross-sectional view of the embodiment of the nut shown in FIG. 7 receiving a male threaded member;

FIG. 14 is a fragmentary cross-sectional view through a fastening effected by my improved nut showing the same in tightened relationship with a pair of panels held together by the fastening;

FIG. 15 is a bottom end view of a nut embodying my invention showing three ramps;

FIG. 16 is a side elevation of the nut of FIG. 15;

FIG. 17 is a cross-sectional view through the nut of FIGS. 15 and 16 showing in cross-section one of the ramps;

FIG. 18 is a perspective view of the bottom end of the nut of FIG. 15;

FIG. 19 is a fragmentary perspective of one of the ramps of the nut of FIGS. 15–18;

FIG. 20 is a side elevation of a headed male threaded member embodying the ramps of my invention;

FIG. 21 is an end view of the underside of the head of screw member of FIG. 20;

FIG. 22 is a side elevation showing my invention embodied in a washer; and

FIGS. 23–25 are various views of a stamped nut embodying my invention.

DESCRIPTION OF THE PREFERRED EMBODIMENTS

Figure 1:
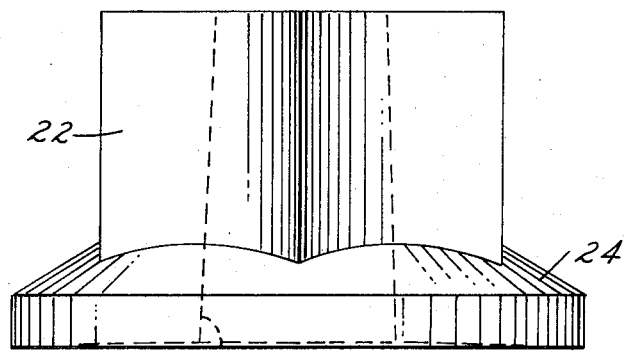
FIG. 1 is a side view of one embodiment of the nut of this invention, prior to forming the ramps.

The first embodiment of the invention is shown in FIGS. 2 to 4, 6 and 6A, and comprises a nut 20 for threaded connection with a bolt 60 or the like. The nut includes a body portion 22 which may have a wrench-engaging hexagonal exterior with a radial flange 24 at one end of the body and an aperture or bore 26 extending through the body and opening through opposite ends as at 30 and 31. The end 30 of the bore 26 opens through an end face 34 which is adapted to abut the surface of a part against which the nut is to be tightened on the bolt to effect the fastening action. Disposed adjacent the opening 30 of bore 26 and rising from the end face 34 are a pair of opposed spirally arranged ramps or lips 28. These ramps or lips are adapted to contact the surface of the part against which the nut is tightened in effecting the fastening action. The bore 26 of the nut is shown as smooth and generally conical. It is to be understood that such bore may be cylindrical as at 126 in FIG. 7 and may, instead of being smooth, be provided with a thread conventionally found in nuts. The major diameter of the bore is at the opening 30, and the minor diameter at opening 31.

Each of the ramps has a sloping ramp face 33 which at one end merges or blends with the end face 34 and rises through a spiral path to the high point 35 where it terminates at a locking face 36 which extends from such high point substantially perpendicularly toward the end face 34. The face 36 of each ramp looks in the direction of unthreading rotation of the nut. As a consequence, the faces 36 of the pair of ramps will serve to resist unthreading of the nut when the ramps have been buried in the surface of the part against which the nut is tightened.

Each of the ramps or lips 28 is geometrically arranged in spiral form, as distinguished from concentric relation, about the axis of the bore 26. This is best illustrated in FIG. 4 where it will be observed the sloping surface 33 at the high point 35 is closer to the bore, or to the axis of the bore, than is the opposite end 37 where the sloping surface merges with the surface 38.

This non-concentric arrangement of the ramps is referred to herein as a spiral arrangement. The sloping face 33 of each ramp is helical in nature because it rises axially from the end face 34 to its high point 35. However, it also follows the spiral geometry of the ramp and therefore may be thought of as a volute surface.

The ramp face 33 of each ramp slopes in a direction or at a helix angle that is opposite to the slope or helix angle of the bolt upon which the nut is to be mounted. This is best shown in FIG. 6A where a cross-sectional fragment of a nut body 22 having a bore 26 into which a bolt has been threaded, as in FIG. 6, and then withdrawn, illustrates the threads 64 formed in the bore by the bolt. These threads are shown as right-hand. One of the ramps is also shown in FIG. 6A in profile or elevation and it will be noted that the volute surface 33 slopes opposite to the slope or helix angle of the threads 64.

Figure 2:
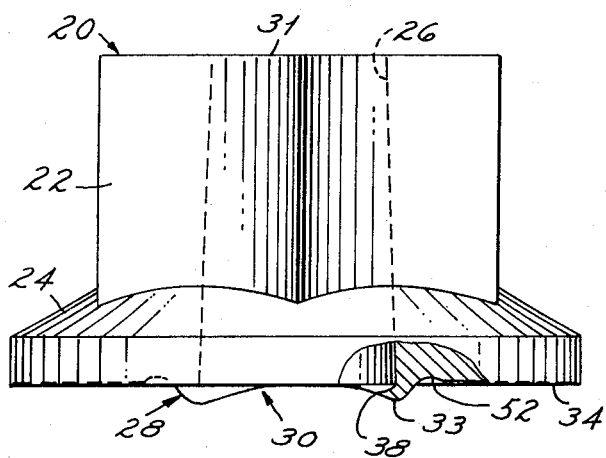
FIG. 2 is a side view, partially cross-sectioned, of one embodiment of the nut of this invention.
Figure 3:
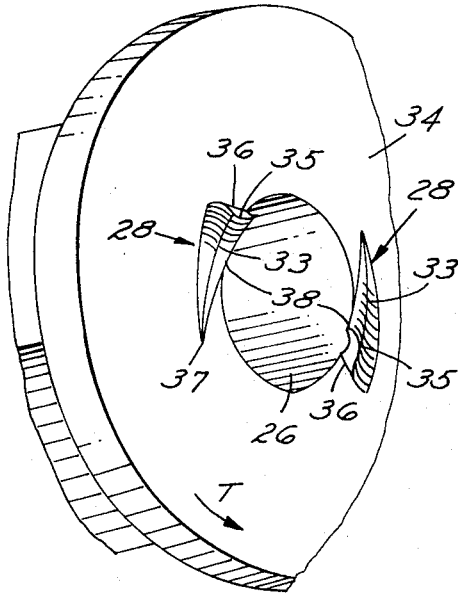
FIG. 3 is a schematic perspective end view of the nut shown in FIG. 2.
Figure 4:
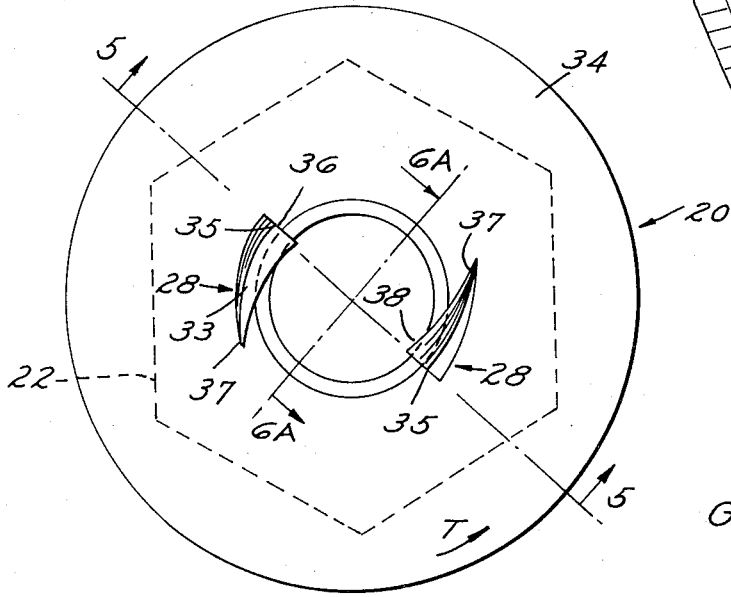
FIG. 4 is an end view of the nut shown in FIG. 2.

The ramps or lips 28, when utilized with an unthreaded nut bore, as in the embodiment of FIGS. 2-4, are desirably provided at their inner radial edges with a thread form for engaging the threads of the screw or bolt to effect a "lead screw" action to facilitate and guide the screw member or bolt into the end 30 of the nut bore as the nut and bolt are connected together. This thread form on the ramps or lips may be provided by forming the ramps with a generally C-shaped cross-section at the ends of the ramps most closely adjacent the opening 30. As shown in FIGS. 2 and 4, a radial inner edge 38 extends radially inwardly beyond the major diameter of the bore 26 at the opening 30 to engage the threads of a male threaded member inserted into the end 30 of the nut bore. A male threaded element such as a screw or bolt is shown in phantom outline in FIG. 2 at S with its end threaded into the thread form defined by the edge 38 of the ramps with the end of the bolt starting into the smooth wall of the bore 26.

In view of the fact that the high point 35 of each of the sloping surfaces 33 of each ramp is the first to engage the surface of the member against which the nut is tightened, as the nut rotates in the direction of the arrow T in FIGS. 3 and 4, the ramps will serve to iron or force the material of the part against which the nut is tightened radially inwardly toward the aperture through which the bolt extends and upon which the nut is mounted, with the result that the margin of the hole surrounding the bolt is urged into the bolt threads. This is illustrated by the arrangement disclosed in FIG. 14 which may be considered typical of the result of utilizing any of the nuts disclosed herein. In such Figure the nut is indicated at N, the panel or part against which it bears at P1, a second part against which the head H of the bolt S bears at P2. The phantom lines P1-a and P1-b suggest the shape of the hole A through the part P1 prior to tightening the nut N down against the surface P1-c. After the tightening action the margin of part P1 surrounding the hole A at the surface P1-c is deformed radially inwardly as shown in solid outline and indicated at D and is embedded in and against the threads TH of the screw or bolt S. This radial inward deformation of the part P1 is the result of the ironing action of the ramps and their spiral form as the nut is turned against the surface P1-c.

The method of forming the nut shown in FIGS. 2–4 is disclosed in FIGS. 1 and 5. The body portion including the hexagonal portion 22, the flange portion 24 and the conical aperture 26, may be formed by conventional processes that need not be described. The resulting blank will appear as in FIG. 1. Thereafter a conical mandrel or die member 40 is received in the open end 30 of the aperture 26 as shown in FIG. 5 and is supported on or adjacent a second mandrel or piston 42 of cylindrical shape. The end of the mandrel 40 is configured at 44 to receive the ramps or lips to form the edge 38 above mentioned. With the parts in the position shown a die member 46 is driven against the surface 34 to upset the same and form the ramps forcing some of the nut material radially inwardly to form the edge 38. It will be noted that a recessed or concave area is formed as at 48 in the face 34 of the nut. The mandrel 42 is then removed upwardly, the mandrel 40 rotated to bring the edges 38 into registry with axial slots in the periphery of the mandrel and then the mandrel removed from the bore downwardly after the die 46 has been withdrawn. The removal of the mandrel 40 is referred to in greater detail in reference to FIG. 11 hereinafter described.

In FIG. 6 the threading of a bolt 60 or other male threaded member into the nut 20 is shown. The bolt is started through the thread form at the edge 38 of the lips or ramps and as the bolt is rotated and urged axially into the nut the ramps serve as a lead screw in insuring and facilitating reception of the bolt into the tapered bore of the nut. The male threaded member 60 is formed of a harder material than the nut such that the threads 62 of the male member deform the smooth internal wall of the bore to form female thread 64. The nut may thus be formed from various plastics and the male threaded member may be metal. The nut may also be formed from a softer metal than the bolt, such as SAE 1010 steel, where the male threaded member is formed of SAE 1028 steel.

The utilization of a tapered or conical bore 26 reduces the torque required to start the male member or bolt in the unthreaded bore as shown in FIG. 12. The ramp or lip 28 extends radially inwardly beyond the wall of the bore to be received within the helical groove 65 between adjacent threads of the male screw member. The edge 38 of the ramp 28 guides the male screw member into the aperture 26 acting as a "lead screw" in assisting threading of the nut on the bolt.

It can be seen from FIG. 12 that the diameter of the conical aperture 26 adjacent the ramp is greater than the pitch diameter 66 of the male threaded member, and reduces to less than the pitch diameter. The female threads 64, formed in the bore, are therefore not fully formed adjacent the ramp as the material 68 is displaced is insufficient. Each female thread formed is however, fuller than the last, until a full thread is formed when the diameter of the conical bore is equal to the pitch diameter of the bolt. The torque required to thread the bolt in the aperture therefore increases at a predetermined rate permitting monitoring the progress of the bolt.

The embodiment of the nut 120 shown in FIG. 7 is similar to the nut 20 described hereinabove except that the aperture or bore 126 is cylindrical, and a concave groove 48 is not formed adjacent the ramps or lips 128. The nut includes the hexagonal wrench-engaging portion 122 and a flange portion 124 similar to those described above. The method of forming the lips or ramps is shown in FIGS. 8 to 11.

A pair of rectangular axially extending spirally arranged shoulders 127 are formed adjacent to and spaced from the bore 126 during formation of the body portion of the nut as shown in FIG. 9. The shoulder portions 127 extend about the bore approximately 90°. A generally cylindrical mandrel 140 is received in the aperture or bore 126 as shown in FIG. 8. The mandrel includes a pair of opposed helical grooves 144 configured to receive and form a thread form at the radial inner edges of the ramps as at 138 in FIG. 7. The grooves 144 are positioned opposite the shoulders 127 and the end 134 of the nut is impacted by a die member 146 configured to deform the shoulders radially into the grooves 144 in the mandrel 140. The die member 146 includes an aperture 141 which receives the end of the mandrel 140. The upper end of the die member 146 has a concave spirally arranged recess 150 adapted to engage the radial outer surface of the shoulders and form them into a configuration generally similar to that of the ramps 28 of the nut of FIGS. 2–4. In addition, the concave surface 150 serves to force the shoulders radially inwardly and into the grooves 144 in the mandrel 140. The mandrel 140 includes a pair of slots 170, adjacent the grooves 144, which extend through the end of the mandrel as shown in FIG. 11. After forming the thread edge 138 on the ramps, the mandrel 140 is removed by rotating it approximately 90° which disposes the edges 138 of the ramps in the slots 170 permitting axial withdrawal of the mandrel from the nut.

FIG. 13 illustrates the configuration of the female threads 164 formed by threading a male threaded fastener or bolt 160 into the unthreaded bore 126 of this embodiment. The diameter of the bore 126 is approximately equal to the pitch diameter 166 of the bolt. It will be understood, however, that a slight clearance will normally be provided in metal-to-metal applications, such as 0.003 inches. The first female thread 165, in this embodiment, will be substantially fully formed because the area radially inwardly of the pitch diameter is equal to the area radially outwardly of the pitch diameter. The other features of the assembly are similar to the embodiment shown in FIG. 12 and have been numbered accordingly.

FIGS. 15–19 show a nut embodying the invention wherein three ramps 228A, 228B and 228C are provided, and the nut has a straight threaded bore 226. As shown, each ramp extends circumaxially about 45°. Each is arranged spirally as described in connection with the nut of FIGS. 2–4. Each ramp has a volute ramp surface 233 and a locking face 236. The inner edges of the ramps may extend radially inwardly of the bore and the bore threads 226 may extend outwardly through such edges to provide a thread form thereon as indicated at 238. The volute surface 233 is at the opposite angle from the nut bore threads, and the spiral arrangement of the ramps is similar to the nut of FIGS. 2–4 such that upon tightening the nut against the surface of a panel, the marginal edge of the panel hole is ironed or forced inwardly as previously described to embed the panel material in the threads of the bolt as shown by the exemplification in FIG. 14.

While the ramps 228A, 228B and 228C have been shown and described as having inner edges extending radially inwardly of the threaded bore and that the bore threads are continued through such edges to provide a thread form thereon as at 238, it should be understood that the ramps may be disposed and configured so that they do not overhang the threaded bore. In such case their spiral arrangement and volute ramp surface will still serve to iron the panel into the bolt hole and into embedded relation with the bolt threads, and the locking face 236 will still serve to prevent loosening rotation of the nut after the ramps have been embedded in the surface of the panel.

In FIGS. 20 and 21 a bolt is shown having a threaded shank 360, a head 362 and three ramps 364, 366 and 368 arranged in spiral arrangement about the shank. Each ramp has a volute sloping face 370 and a locking face 372 disposed essentially perpendicular to the underside of the head. When the bolt is inserted in a panel hole and tightened to draw the head against the panel surface the ramps are embedded in the panel surface and the locking face 372 of each ramp, which looks in the direction of bolt loosening rotation, resists loosening rotation of the bolt. This locking embedment of the ramps will arise whether the bolt head is tightened against the panel by rotating the bolt, or whether the bolt head is not rotated but simply pulled against the panel as by turning a nut threaded thereon while holding the bolt.

If the panel hole through which the bolt of FIGS. 20 and 21 is received is threaded so that the bolt is threaded into the panel, or if the hole in the panel is unthreaded and of a diameter approaching the pitch diameter of the bolt shank so that the bolt forms threads in the hole as it is inserted, a locking action of the bolt and panel may arise similar to the action of the nut shown in FIG. 14. Namely, the ramps 234, 236 and 238 will iron the panel metal into the bolt and hole threads and therein serve a wedging or locking function.

FIG. 22 shows the ramp concept hereinbefore described applied to a washer. A bolt having a head 380 and a threaded shank 382 received through aligned holes 384 and 386 in a pair of panels 388 and 390 has a threaded nut 392 mounted thereon with a washer 394 interposed between the nut and the panel 390 to be compressed therebetween as the nut or bolt is rotated in a tightening direction. The nut and washer have opposed complementary radial serrations 396 and 398 which serve to lock the nut and washer against relative rotation when the nut is tightened down to squeeze the washer between it and the panel 390. The face of the washer opposite the serrations 396 is provided with a plurality of spirally arranged ramps one of which is shown at 400. Each ramp is similar to the ramps described in connection with the bolt of FIGS. 20 and 21 or in connection with the nuts of FIGS. 2–4 and functions in the same way as the ramps of the latter in ironing the material surrounding the hole 386 radially inwardly and into the threads of the shank 382. In addition, the locking face 402 of the ramp will prevent loosening rotation of the nut. The washer 394 may be provided with a threaded aperture or a smooth aperture for reception over the shank 382, as desired.

In FIGS. 23–25 I have shown a nut embodying my ramp concept which is formed by stamping. The nut includes an outer hexagonally shaped wall 422 integral with a bottom wall 424 with an inner cylindrical wall 426 integral with the bottom wall and rising therefrom as best shown in FIG. 23. The inner wall is of cylindrical configuration and may have a threaded or nonthreaded bore 428, as desired. The outside surface 430 of the bottom wall 424 exhibits three ramps 432, 434 and 436 which are spirally arranged as described in connection with the nuts of FIGS. 2–4 and each has a volute sloping ramp surface, such as the surface 438 on ramp 434. In addition each ramp has a locking end face, such as the face 440 for the ramp 432.

The ramps may be curled inwardly, if desired, to overhang the bore 428 of the nut as shown in FIG. 25 and the inner radial edge of each ramp may be provided with a thread shape to engage the threads of a bolt or the like to be threaded through the nut. The threaded edge of the ramp is indicated in FIG. 25 at 442. The thread form edge 442 will serve a lead screw function in facilitating the threading of a bolt through the nut bore 428 when the same is unthreaded. The spiral arrangement of the ramps will, as in the case of the nut shown in FIGS. 2–4, iron the marginal edge of a panel, surrounding a hole through which a bolt extends and upon which the nut is mounted, into the threads of the bolt similar to the action described in connection with FIG. 14. In addition, the end locking face 440 of each ramp will, when the ramp is embedded in the panel surface, resist loosening rotation of the nut.

It will be understood that the volute or sloping face of each ramp for the various nuts, the bolt of FIGS. 20 and 21, and the washer of FIG. 22, allows rotation of the nut, bolt, or washer in a tightening direction while the locking face at the end of the ramp will strongly resist opposite rotation once the ramps have been embedded in the panel surface. Further, in the exemplification of FIG. 14 when the marginal edge of the bolt hole in a panel is ironed into the threads of the bolt as at D, as a result of the rotation of the nut and the spiral arrangement of the ramps, the panel becomes directly locked to the bolt. By the cold flow of the ramps curling radially inwardly around the bolt, some of the ramp material has been found to extrude downwardly into the space between the bolt threads and the panel as at D-1 serving to further insure the locking of the nut against loosening rotation.

What is claimed is:

1. A fastener element adapted to abut a structural member about a hole therethrough and form a part of a screw threaded connection extending through such hole, comprising:

a member having an annular face adapted to overlie the margin of the structural member about the hole therethrough, a plurality of ramps integral with and projecting outwardly from said annular face and arranged circumaxially thereon, each ramp having a sloping surface extending therealong from a low end blending with said face to the opposite higher end disposed outwardly beyond said face, the sloping surface of each ramp being opposite the helix angle of the threaded connection of which the fastener is to form a part, each ramp spirally arranged on said annular face about the axis thereof with said one end of each ramp being radially closer to the axis of the annular face than the said opposite end, whereby upon tightening rotation of the screw threaded connection urging said annular face against the structural member about a hole therethrough, each ramp will iron portions of the structural member underlying such annular face radially inwardly toward and into engagement with a portion of the screw threaded connection extending through such hole and with the ramps embedded in the surface of the structural member, said fastener being a nut and said annular face being an annular surface of the nut surrounding a screw receiving aperture in the nut, said aperture being unthreaded and said ramps having edge portions overhanging the margin of the aperture and defining a thread form for engaging a screw member to be received in the aperture to provide a lead screw action therewith.

2. A nut for use with a male screw threaded member comprising:

a body having a wrench engaging surface with an aperture opening outwardly through an end surface of the body for receiving the male screw threaded member therein, said end surface provided with a plurality of ramps arranged spirally adjacent said aperture such that one end of each ramp is closer to the aperture than the other end, each ramp having a surface sloping from said other axially outwardly to said one end with the angle of such slope being opposite the helix angle of the thread of the male screw threaded member, said aperture in the nut being unthreaded and each ramp at said one end overhanging the aperture and provided with a thread form edge to threadedly engage a male screw threaded member introduced into the aperture.

3. The invention defined by claim 2 characterized in that said aperture is tapered with the aperture adjacent said annular surface having a greater diameter than spaced inwardly along the aperture from such surface.

* * * * *

PO-1050
(5/69)

UNITED STATES PATENT OFFICE
CERTIFICATE OF CORRECTION

Patent No. 3,693,685    Dated September 26, 1972

Inventor(s) George R. Onufer

It is certified that error appears in the above-identified patent and that said Letters Patent are hereby corrected as shown below:

Column 10, line 23, at end of line, after "other" insert --end--.

Signed and sealed this 13th day of February 1973.

(SEAL)
Attest:

EDWARD M. FLETCHER, JR.
Attesting Officer

ROBERT GOTTSCHALK
Commissioner of Patents